s(12) United States Patent
Jamal et al.

(10) Patent No.: US 6,724,813 B1
(45) Date of Patent: Apr. 20, 2004

(54) IMPLICIT RESOURCE ALLOCATION IN A COMMUNICATION SYSTEM

(75) Inventors: Karim Jamal, Vallingby (SE); Paul P. Butovitsch, Bromma (SE); Erik B. L. Dahlman, Bromma (SE); Riaz Esmailzadeh, Yokohama (JP); Per Willars, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/172,015

(22) Filed: Oct. 14, 1998

(51) Int. Cl.[7] .................................................. H04B 1/38
(52) U.S. Cl. ........................ 375/219; 455/450; 455/452
(58) Field of Search ................................ 375/140, 141, 375/144, 145, 146, 147, 148, 135, 136, 219, 220; 370/319, 320, 321, 324, 335, 337, 342, 344, 347, 432, 441, 457; 455/518, 519, 524

(56) References Cited

U.S. PATENT DOCUMENTS

| 5,103,459 | A |   | 4/1992  | Gilhousen et al. |             |
|-----------|---|---|---------|------------------|-------------|
| 5,166,929 | A | * | 11/1992 | Lo               | 370/448     |
| 5,168,575 | A | * | 12/1992 | Cizek et al.     | 455/15      |
| 5,206,882 | A |   | 4/1993  | Schloemer        |             |
| 5,353,352 | A |   | 10/1994 | Dent et al.      |             |
| 5,381,447 | A |   | 1/1995  | Ayerst et al.    |             |
| 5,430,760 | A | * | 7/1995  | Dent             | 375/141     |
| 5,430,761 | A | * | 7/1995  | Bruckert et al.  | 375/144     |
| 5,442,681 | A | * | 8/1995  | Kotzin et al.    | 455/15      |
| 5,461,639 | A | * | 10/1995 | Wheatley et al.  | 370/342     |
| 5,544,223 | A | * | 8/1996  | Robbins et al.   | 455/426.2   |
| 5,550,809 | A |   | 8/1996  | Bottomley et al. |             |
| 5,603,085 | A | * | 2/1997  | Shedlo           | 455/450     |
| 5,603,096 | A | * | 2/1997  | Gilhousen et al. | 455/69      |
| 5,659,569 | A | * | 8/1997  | Padovani et al.  | 370/479     |
| 5,771,229 | A | * | 6/1998  | Gavrilovich      | 370/342     |
| 5,781,856 | A | * | 7/1998  | Jacobs et al.    | 455/403     |
| 5,867,785 | A | * | 2/1999  | Averbuch et al.  | 455/436     |
| 5,974,325 | A | * | 10/1999 | Kotzin et al.    | 455/15      |
| 6,188,905 | B1| * | 2/2001  | Rudrapatna et al.| 455/452     |
| 6,223,041 | B1| * | 4/2001  | Egner et al.     | 455/450     |
| 6,275,500 | B1| * | 8/2001  | Callaway et al.  | 370/346     |
| 6,324,208 | B1| * | 11/2001 | Bhagalia et al.  | 375/145     |
| 6,351,461 | B1| * | 2/2002  | Sakoda et al.    | 370/335     |
| 6,374,112 | B1| * | 4/2002  | Widegren et al.  | 370/352     |
| 6,393,047 | B1| * | 5/2002  | Popovic'         | 370/342     |
| 6,498,785 | B1| * | 12/2002 | Derryberry et al.| 370/311     |

FOREIGN PATENT DOCUMENTS

EP          0 765 096 A     3/1997
WO          95/03652        2/1995

* cited by examiner

Primary Examiner—Khai Tran
Assistant Examiner—Khanh Cong Tran
(74) Attorney, Agent, or Firm—Nixon & Vanderhye P.C.

(57) ABSTRACT

In a communications system, communications resources are allocated in a dynamic, "as needed" fashion. No explicit signaling is needed to exchange information pertaining specifically to an allocated communications resource. Instead, resources are implicitly allocated by using one or more parameters known to both the radio access network and mobile station that are more or less unique to the mobile station. Such parameters are used to generate or address a communications resource for use by the mobile station. The parameters might, for example, be information readily acquired or communicated as a result of a synchronization procedure, a mobile station registration procedure, a mobile station access procedure, a paging procedure, etc. Example parameters may include a system frame number, a system identification, a radio access network identification, a base station identification, a cell identification, a mobile station-associated signature, an access reference number corresponding to the mobile station, a time instant when an acknowledgment message is received, etc.

27 Claims, 7 Drawing Sheets

IMPLICIT RESOURCE ALLOCATION IN A COMMUNICATION SYSTEM

FIELD OF THE INVENTION

The present invention relates to resource allocation in communications systems. One advantageous application of the invention relates to allocation of scrambling codes used to distinguish dedicated mobile-to-network connections in a Code Division Multiple Access (CDMA) cellular radio communications system.

BACKGROUND AND SUMMARY OF THE INVENTION

A direct sequence spread spectrum (DSSS) system is a wideband system in which the entire frequency bandwidth of the system is available to each user all of the time. A DSSS system employs a spreading signal, i.e., a pseudo-random noise (PN) sequence, that expands or "spreads" the bandwidth of the transmitted signal much more than is required for the transmission of information symbols. The spreading signal is usually called a spreading code or sequence. Different users in a DSSS system may be distinguished using different codes. Such multi-user, DSSS systems are also referred to as direct sequence-code division multiple access (DS-CDMA) systems. Therefore, spreading codes are used to perform two basic functions:

(1) spread the bandwidth of a modulated signal to a larger transmission bandwidth
(2) distinguish among different user signals which are using the same transmission bandwidth in the multiple access scheme.

For purposes of this description, two different terms are used to distinguish between these two spreading code functions. A "spreading code" spreads the information symbol stream to higher rate. A "scrambling code" scrambles the signal to uniquely identify it with a particular user. Typically, the scrambling operation does not change the rate of or further spread the signal (although it could). Even though separate spreading and scrambling codes are described, they could be combined into a single code that performs both spreading and scrambling (mobile identification) functions.

Orthogonal functions are typically employed to improve the bandwidth efficiency of a spread spectrum system. Each network-to-mobile connection typically uses one member of a set of orthogonal functions representing the set of symbols used for transmission. While there are many different sequences that can be used to generate an orthogonal set of functions, the Walsh-Hadamard sequences are common examples used in CDMA systems. Such an orthogonal set of functions can be used as spreading codes. Thus, on the forward or downlink channel (base station-to-mobile), orthogonal functions are used to minimize multiple access interference among users in the same cell. At the base station transmitter, the input user baseband data, such as digital speech, is multiplied by an orthogonal function with the resulting product then being spread by the base station spreading code and combined with some other spread user data for other mobiles before being transmitted on the RF carrier. At the mobile receiver, after removing the RF carrier, the mobile multiplies the baseband signal by the synchronized scrambling code associated with the base station and then multiplies the resulting product with a synchronized spreading code, e.g., orthogonal function, for that mobile user to suppress the interference due to transmission from the base station to other users.

In the uplink or reverse direction (mobile-to-base station), spreading codes from an orthogonal set need not be used in principle since orthogonality cannot be readily maintained anyway. This is because various mobile stations are located at different distances from the base station, and the mobile-transmitted signals received at the base station are not synchronized. However, it is often desirable to have the possibility of multi-code transmission, i.e., a plurality of spreading codes are used simultaneously. In such a case, it is advantageous that such spreading codes are different members of an orthogonal set, since this would maintain orthogonality among the codes used by a certain mobile-to-network connection. Consequently, orthogonal spreading codes are often used in the uplink direction as well, although it is not strictly needed for reasons of inter-connection orthogonality.

While the downlink scrambling codes are cell-specific, and thus statically allocated in the cell planning process, the uplink scrambling codes are specific to each mobile-base station communication and therefore require an allocation strategy. One strategy is to statically allocate uplink scrambling codes so that each mobile station or mobile station to base station dedicated communication is assigned its own more or less unique uplink scrambling code. Scrambling codes are not shared by other mobiles. The problem with this approach is that there must be some coordination between all manufacturers of mobile stations, and thus, global administration of uplink scrambling codes, which is unnecessary and undesirable.

Therefore, it is desirable to pool the uplink scrambling codes and then dynamically assign them to mobile stations on an "as needed" basis. While a dynamic approach is more efficient, there is a possible disadvantage. Since an uplink scrambling code is not known in advance to both the mobile and base stations, both the mobile station and the base station need to be informed of the uplink scrambling code allocated to a particular mobile station for a particular connection. Regardless of whether the mobile station or the base station selects the uplink scrambling code, some sort of control signaling must be used to notify the other station of the selected uplink scrambling code so that the appropriate scrambling and descrambling operations can be performed at both the mobile and base stations. That explicit scrambling code control signaling causes delay and consumes valuable communications resources.

It is an object of the present invention to efficiently allocate communications resources.

It is another object of the invention to dynamically allocate communications resources without delay and without consuming communications resources.

It is a further object of the invention to dynamically allocate communications resources like uplink scrambling codes on an "as needed" basis without requiring control signaling between a mobile station and a base station to exchange uplink information explicitly identifying a particular communications resource.

The present invention solves the above-identified problems and meets the above-identified objects (and others) by implicitly allocating communications resources in a dynamic, as-needed fashion. No explicit signaling is employed to exchange information pertaining specifically to the allocated communications resource. Instead, the implicit allocation employs parameter(s) already known to both the network and the mobile. Such unique, already-known parameter(s) is (are) then used to generate or address a communications resource. The parameters might include, for example, information readily acquired from or communicated as a result of a communications between the mobile station and the network over one or more common control channels. Such communications may include a synchronization procedure, a mobile access procedure, a paging procedure, etc. Example parameters may include a system frame number, a system identification, a cell identification, a mobile-associated signature, an access reference corresponding to the mobile station, a time instant when an acknowledgment or other message is transmitted or received, etc.

In a spread spectrum communications system, the channel resource may correspond to scrambling codes used to transmit an information signal from a mobile station to a base station/network. A scrambling code generator in the mobile station determines a scrambling code from one or more parameters available at the mobile and base stations that distinguishes the particular mobile station to base station dedicated communication from other mobile station to base station dedicated communications. The one or more parameters may be available at the mobile and base stations as a result of one or more control signaling (typically initialization) procedures performed to enable communication between the mobile station and base station/network. Advantageously, the one or more parameters are not directly related to scrambling codes used to distinguish among mobile station to base station dedicated communications. This eliminates the need for explicit control signaling exchanged between the mobile and base stations relating to a specifically allocated uplink scrambling code. The information signal is then scrambled using the generated scrambling code and transmitted.

The control signaling procedures may include the mobile station synchronizing with and receiving control channel parameters transmitted over a downlink control channel by the base station and sending a message from the mobile station on a up link, access control channel to the base station including mobile station access parameters. In one example embodiment, the one or more parameters used to generate the scrambling code includes one or more of the downlink control channel parameters and one or more of the mobile station up link access control channel parameters. Also in the example embodiment, the scrambling code generator includes one or more linear feedback type shift registers, the initial contents of at least one shift register being determined using the one or more parameters. A base station transceiver may also use a similar scrambling code generator and the one or more parameters to descramble a received signal of a mobile station using scrambling codes based on the one or more parameters available at the mobile and base stations in order to recover the information signal transmitted by the mobile station.

BRIEF DESCRIPTION OF THE DRAWINGS

These and other objects, features, and advantages of the present invention will now be described in conjunction with the drawings in which.

DETAILED DESCRIPTION OF THE DRAWINGS

In the following description, for purposes of explanation and not limitation, specific details are set forth, such as particular embodiments, procedures, techniques, etc., in order to provide a thorough understanding of the present invention. However, it will be apparent to one skilled in the art that the present invention may be practiced in other embodiments that depart from these specific details. For example, while the present invention is sometimes described in the context of uplink scrambling codes in a spread spectrum, cellular communications system, the present invention may be employed to allocate other types of communication resources. In other instances, detailed descriptions of well-known methods, interfaces, devices, and signaling techniques are omitted so as not to obscure the description of the present invention with unnecessary detail.

Figure 2:
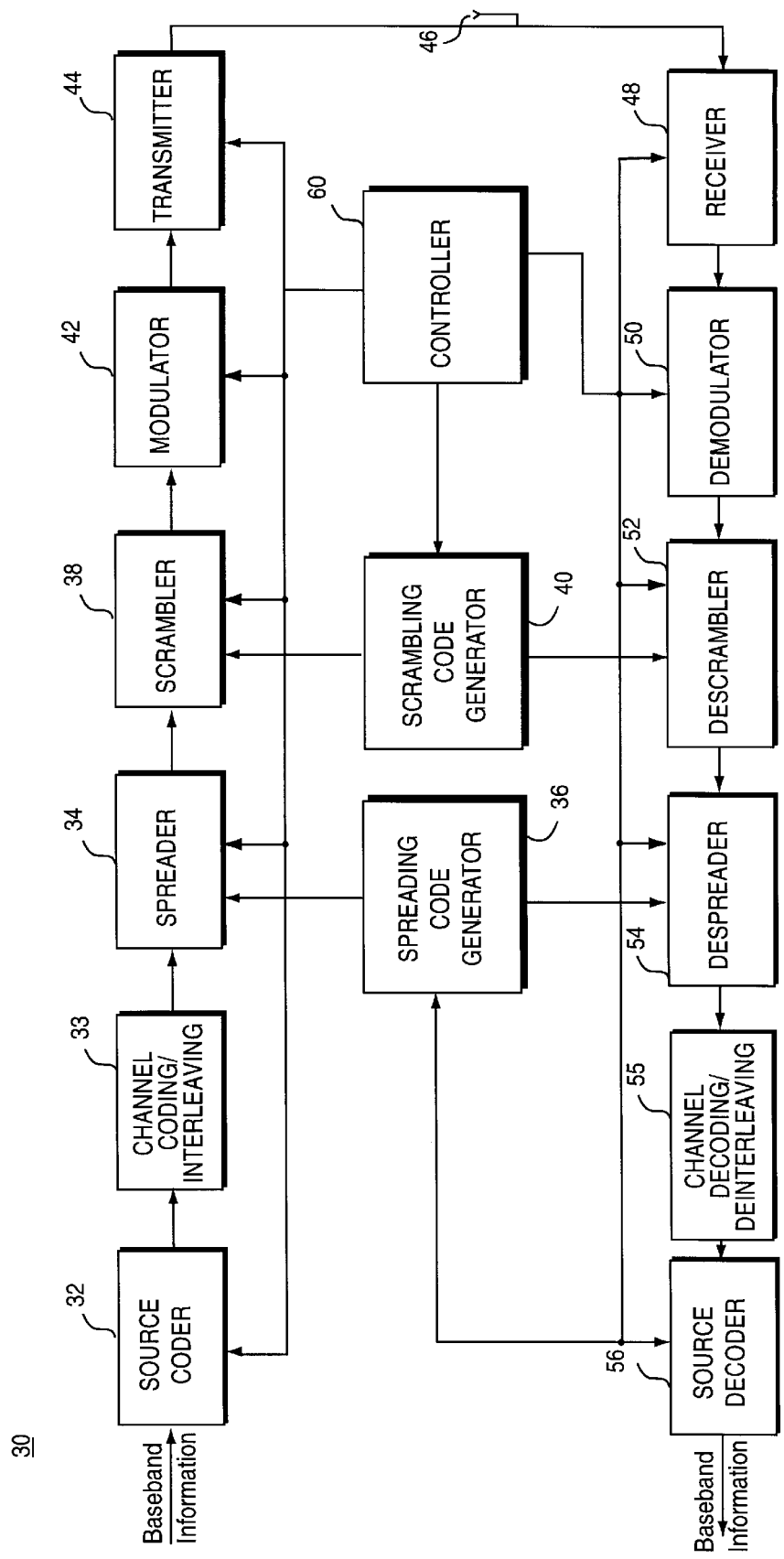
FIG. 2 is a function block diagram of an example radio transceiver in which the present invention may be advantageously employed.

The present invention is described in the context of a universal mobile telecommunications system (UMTS) 10 shown in FIG. 2. A representative, connection-oriented, external core network, shown as a cloud 12 may be for example the Public Switched Telephone Network (PSTN) and/or the Integrated Services Digital Network (ISDN). A representative, connectionless-oriented external core network shown as a cloud 14, may be for example the Internet. Both core networks are coupled to corresponding service nodes 16. The PSTN/ISDN connection-oriented network 12 is connected to a connection-oriented service node shown as a Mobile Switching Center (MSC) node 18 that provides circuit-switched services. In the existing GSM model, the MSC 18 is connected over an interface A to a Base Station Subsystem (BSS) 22 which in turn is connected to radio base station 23 over interface A'. The Internet connectionless-oriented network 14 is connected to a General Packet Radio Service (GPRS) node 20 tailored to provide packet-switched type services. Each of the core network service nodes 18 and 20 connects to a UMTS Terrestrial Radio Access Network (UTRAN) 24 over a Radio Access Network (RAN) interface. UTRAN 24 includes one or more Radio Network Controllers (RNC) 26. Each RNC 26 is connected one or more base stations (BS) 28 and to any other RNC's in the UTRAN 24.

In the preferred embodiment, radio access is based upon wideband, Code Division Multiple Access (WCDMA) with individual radio channels allocated using CDMA spreading codes. WCDMA provides wide bandwidth for multimedia services and other high rate demands as well as robust features like diversity handoff and multi-path diversity to ensure high quality. Each dedicated connection associated with mobile station 24 is assigned its own, uplink scrambling code in order for a base station 20 to identify dedicated channel transmissions from that particular mobile.

A CDMA radio transceiver 30 in which the present invention may be employed is shown in FIG. 2 in function block format. While individual functional blocks are shown in the transceiver 30, those skilled in the art will appreciate these functions may be performed by individual hardware circuits, by a suitably programmed digital microprocessor, by an application specific integrated circuit (ASIC), and/or by one or more digital signal processors (BSPs). A baseband information source such as speech is converted from analog to digital form in a conventional source coder 20. Interleaving and channel coding are preferably performed in block 33. The spreader 34 spreads the symbols from block 33 over the available frequency spectrum, (for wideband CDMA this frequency band could be for example 5 MHz, 10 MHz, 15 MHz, or both), in accordance with a spreading code generated by a spreading code generator 36. The spread signal is then scrambled in a scrambler 38 using a scrambling code that identifies a particular a particular uplink connection associated with the mobile station generated by a scrambling code generator 40. A controller 60 provides control information to all of the blocks shown in FIG. 2, and in particular, with respect to the spreading code generator 36 and the scrambling code generator 40 provides the parameters necessary for them to provide their respective codes. The scrambled signal produced by the scrambler 38 is then pulse-shaped, and the output modulates a radio frequency carrier using a conventional quadrature modulator well known to those skilled in the art. The modulated carrier is transmitted over the air on an RF carrier using a radio transmitter 44 and an antenna 46.

A plurality of spread and scrambled signals overlapping in the allocated frequency band are received together in the form of a composite waveform via antenna 46 at receiver 48. After demodulation in a demodulator 50 to a baseband composite signal, an individual information signal is extracted by multiplying the composite signal with a scrambling code generated by the scrambling code generator 40 allocated to an uplink connection associated with the mobile station. Specifically, the scrambling code generated implicitly by the scrambling code generator 40 using the parameters provided by the controller 60 is used by a descrambler 52 to descramble the demodulated composite signal. The descrambled signal is provided to a despreader 54 which correlates that signal to an appropriate spreading sequence provided by the spreading code generator 36 The despread signal is detected, de-interleaved, channel decoded in block 55 and then converted into analog format by a source decoder 56 to output the desired baseband information.

As explained previously, the spreading codes generated by the spreading code generator 36 and the scrambling codes generated by the scrambling code generator 40 may very well be combined into one "block" to generate a scrambled spreading code. Similarly, at the receiver, the separate descrambling and despreading operations may be combined into a single operation. For multi-path radio channels, a RAKE detector is typically used. In that situation, the descrambling and despreading operations described above are done by each "finger" in the RAKE detector.

Figure 7:
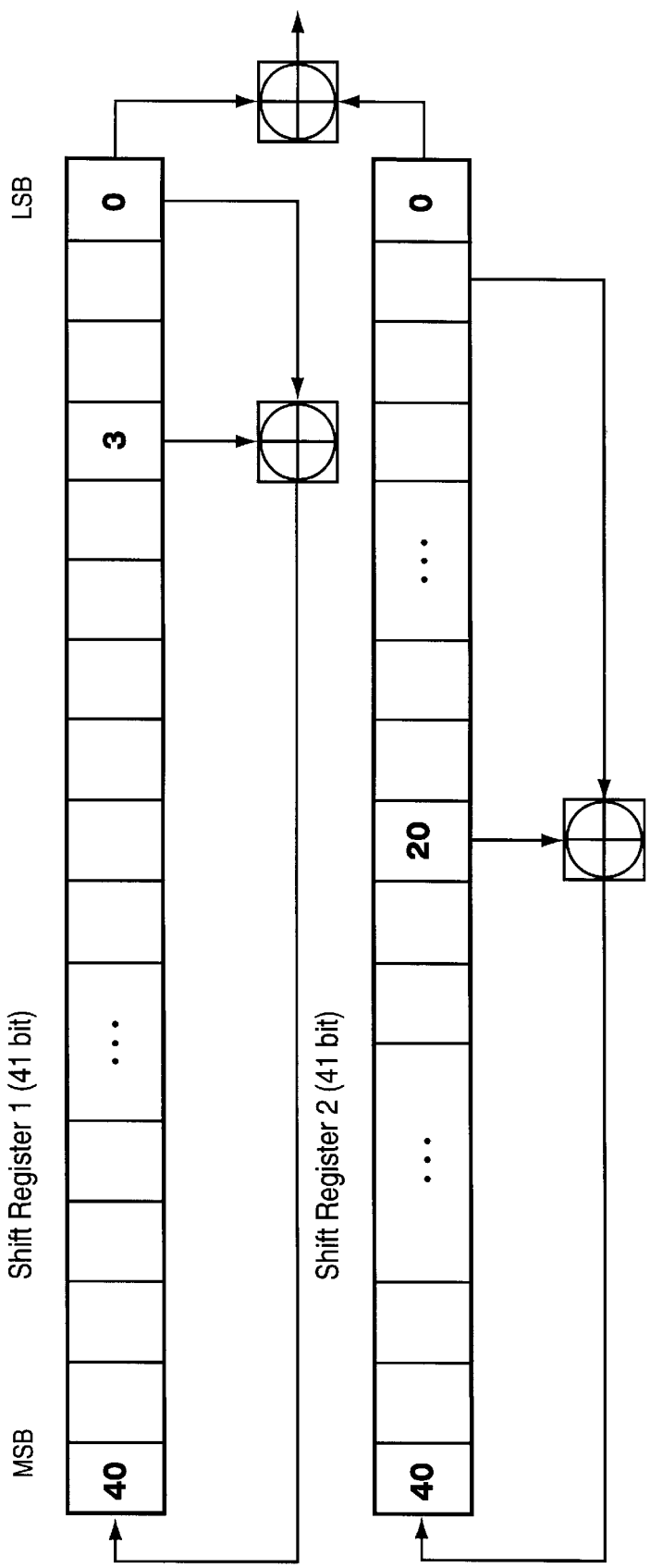
FIG. 7 is a function block diagram illustrating an example scrambling code generator.

The spreading code generator 36 and/or scrambling code generator 40 may be implemented using linear feedback shift registers such as that shown in FIG. 7. The contents of those shift registers determine the specific code that is output from such a shift register. The shift register shown in FIG. 7 generates a "Gold" code. Thus, the initial information set in each of the shift registers by controller 60 determines which code is generated. Alternatively, each of the codes could be stored in a look up table in a RAM or ROM memory, for example, from which a particular code is retrieved by supplying its associated address. Such an address would be provided by the controller 60.

The present invention makes use of implicit information provided between the base station and mobile station in existing signaling procedures such as synchronization, access, registration, and paging procedures. In the CDMA cellular telephone system shown in FIG. 1, each base station cell transmits a synchronization signal to aid downlink acquisition. In addition, each cell transmits a Broadcast Control Channel (BCCH), (one way, point-to-multi-point) which indicates system and cell overhead information. The synchronization signal is used by the mobile to obtain initial system synchronization and to provide time, frequency, and phase tracking of the base station transmitted signals. The BCCH transmits information including system identification (SID), cell identification (CID), a network identification (NID), a system frame number (SFN), and other parameters. When the mobile station determines the strongest cell (e.g., using the detected synchronization signals), it listens to the BCCH from that cell. The BCCH also includes information about how to communicate with the system via common channels, such as spreading codes for the Paging Channel (PCH) and Forward (downlink) Access Channel (FACH) and spreading and/or scrambling codes for the uplink Random Access Channel (RACH).

If the mobile station wants to contact the network, or the network wants to contact the mobile station, such contact occurs initially over a common channel. If the amount of communication is large, the communication may be "moved" to and continued over a dedicated channel. Typical common channels in the downlink direction include: a Paging Channel (PCH) used when the network wants to contact a mobile station without knowing its exact location other than down to a "paging area" (i.e., a group of cells) and a Forward Access Channel (FACH) used to form a paired common communications channel with the Random access Channel in the uplink direction. In the uplink direction, there is typically only one common channel; the Random Access Channel (RACH). Typically, dedicated traffic channels or connections are assigned using the RACH which is usually synchronized to the BCCH. Whenever a mobile station registers with the network, performs a cell-location update, processes an order, sends small or infrequent data bursts, makes an origination, responds to a page, or responds to an authentication challenge, it typically uses the RACH.

Thus, the parameters contained in the BCCH transmitted by the base station and received by the mobile station and those parameters transmitted to the base station by the mobile station on the RACH all have a direct function. The present invention also uses one or more of those parameters for another, indirect function—to dynamically allocate an uplink scrambling code to an uplink, dedicated traffic connection associated with the mobile station.

The dynamic resource allocation of the present invention allocates communication resources, like uplink scrambling codes, implicitly. In other words, rather than sending separate control signals to explicitly identify the allocated resource between the mobile station and the base station, (i.e., one of the base stations and the mobile station informs the other of the identity of the allocated resource), both the mobile station and the base station use information known to both the mobile and the base station to determine an allocated communications resource. Previously established procedures are used by both the mobile station and base station to determine the appropriate resource using the jointly known information. In the example embodiments, the jointly known information is acquired from one or more common control channels.

Figure 3:
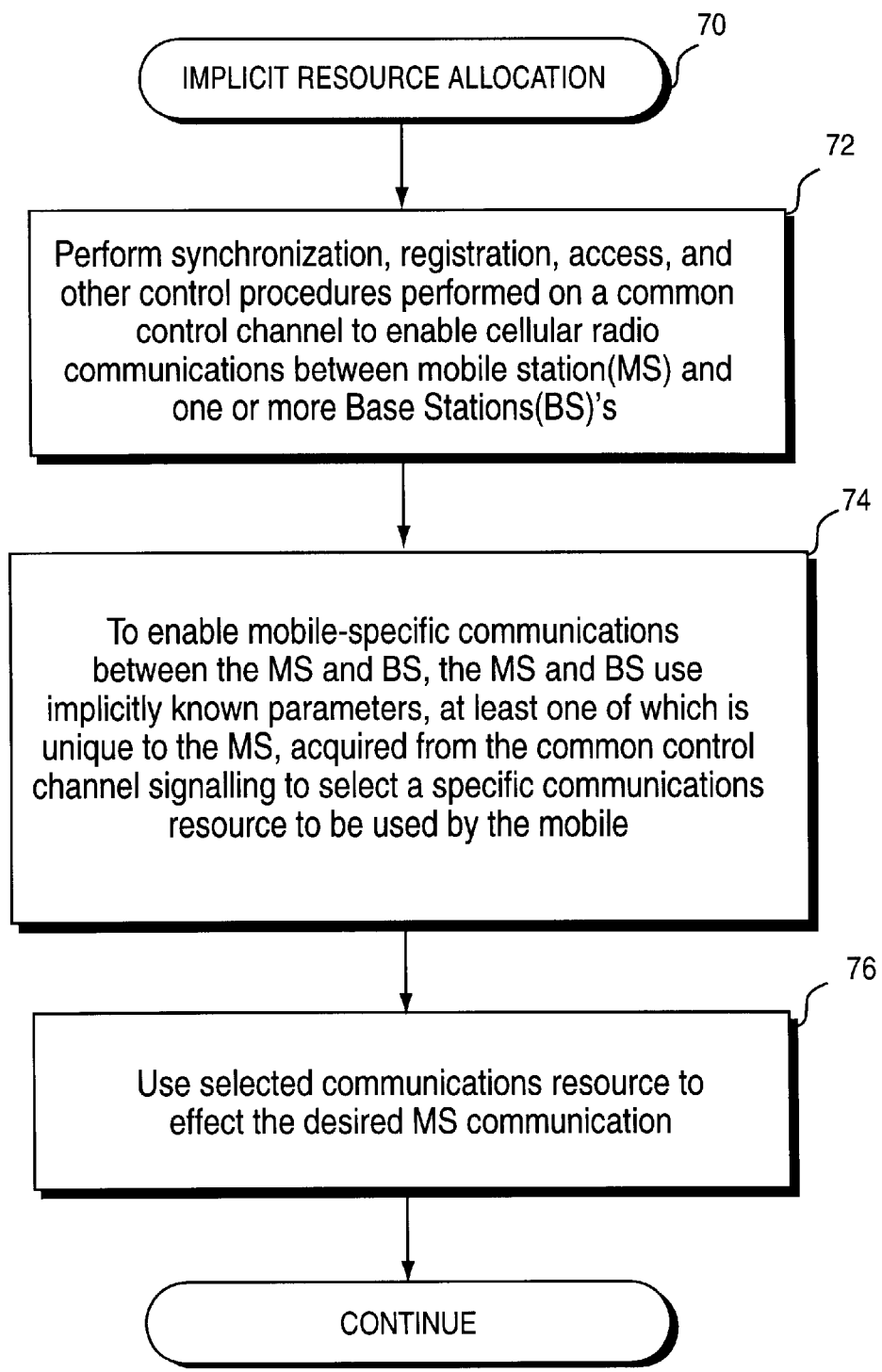
FIG. 3 is a flowchart diagram illustrating an Implicit Resource Allocation routine in accordance with the present invention.

Reference is made to the Implicit Resource Allocation (block 70) procedures shown in flowchart format in FIG. 3.

There are certain signaling or control procedures that must be performed by the mobile station and base station to effect communications via a cellular radio communications system (block 72). Example procedures include synchronization, registration, paging, overhead messages, requesting a channel, etc. These signals are communicated between a mobile station and a base station over one or more common control channels.

For ease of description, these procedures are referred to hereafter as "signaling procedures" and encompass any procedure typically performed to effect or maintain communication between a mobile and base station. However, the signaling procedures in accordance with the present invention do not include specifically identifying a communications resource allocated or dedicated to a mobile station to base station dedicated communication. Nor do they include transmitting information between the mobile station and the base station whose primary purpose is to select or determine the allocated or dedicated resource.

From these signaling procedures, the mobile station and base station acquire implicitly known parameters, at least one of which is more or less unique to the mobile station. Using such implicitly known parameters and possibly other information generally known by both the mobile and the base station, the mobile station and base station/radio access network determine a communications resource which can be used for dedicated traffic communication (block 74). Any number of implicitly known parameters (preferably but not necessarily more than one parameter) may be employed as long as the probability that two MSs using the same scrambling codes in reasonable synchronization with each other is sufficiently small. The selected communications resource is then used by the mobile station to effect the desired uplink communication (block 76).

Figure 1:
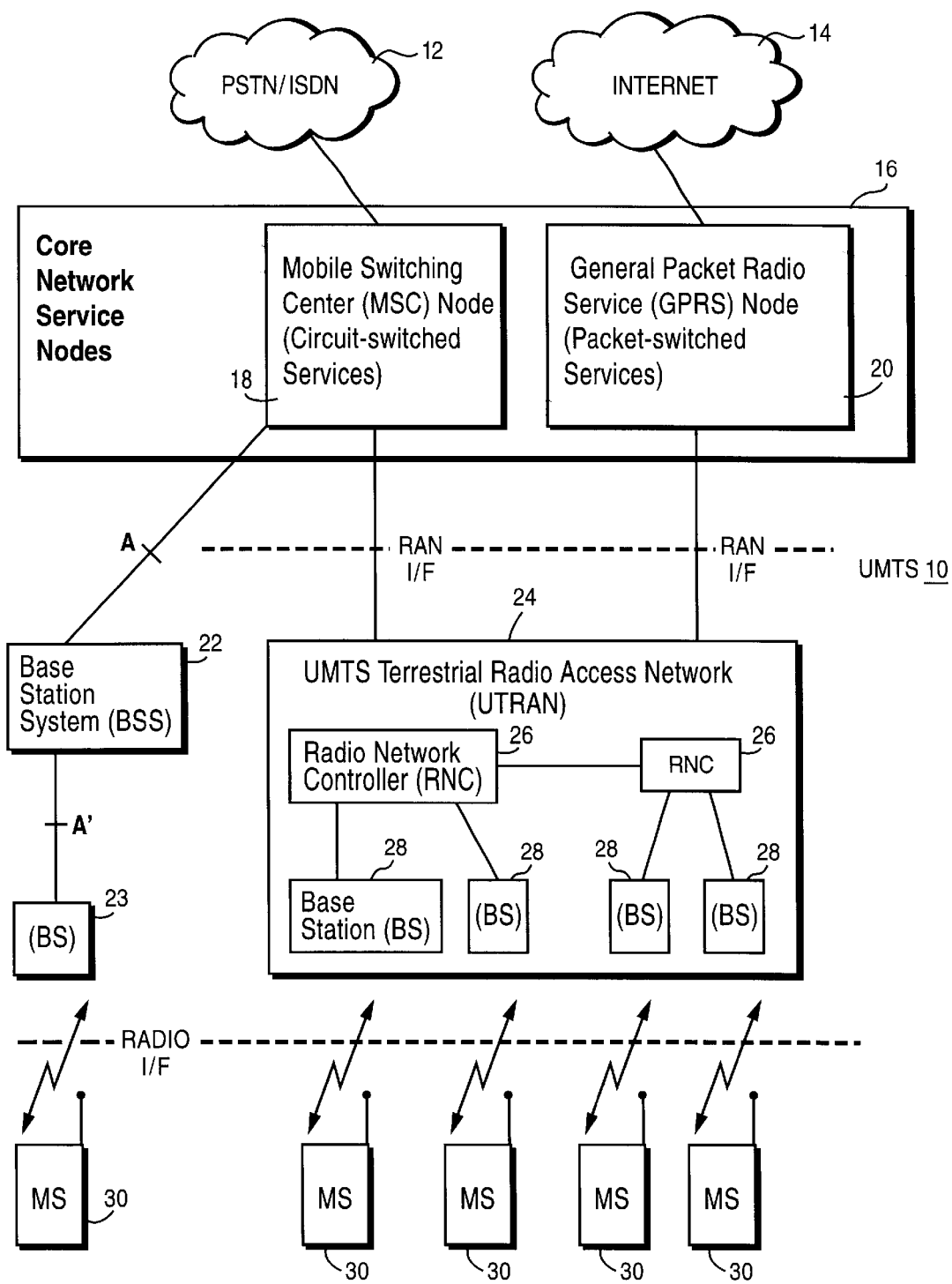
FIG. 1 is a function block diagram of an example mobile communications system in which the present invention may be advantageously employed.
Figure 4:
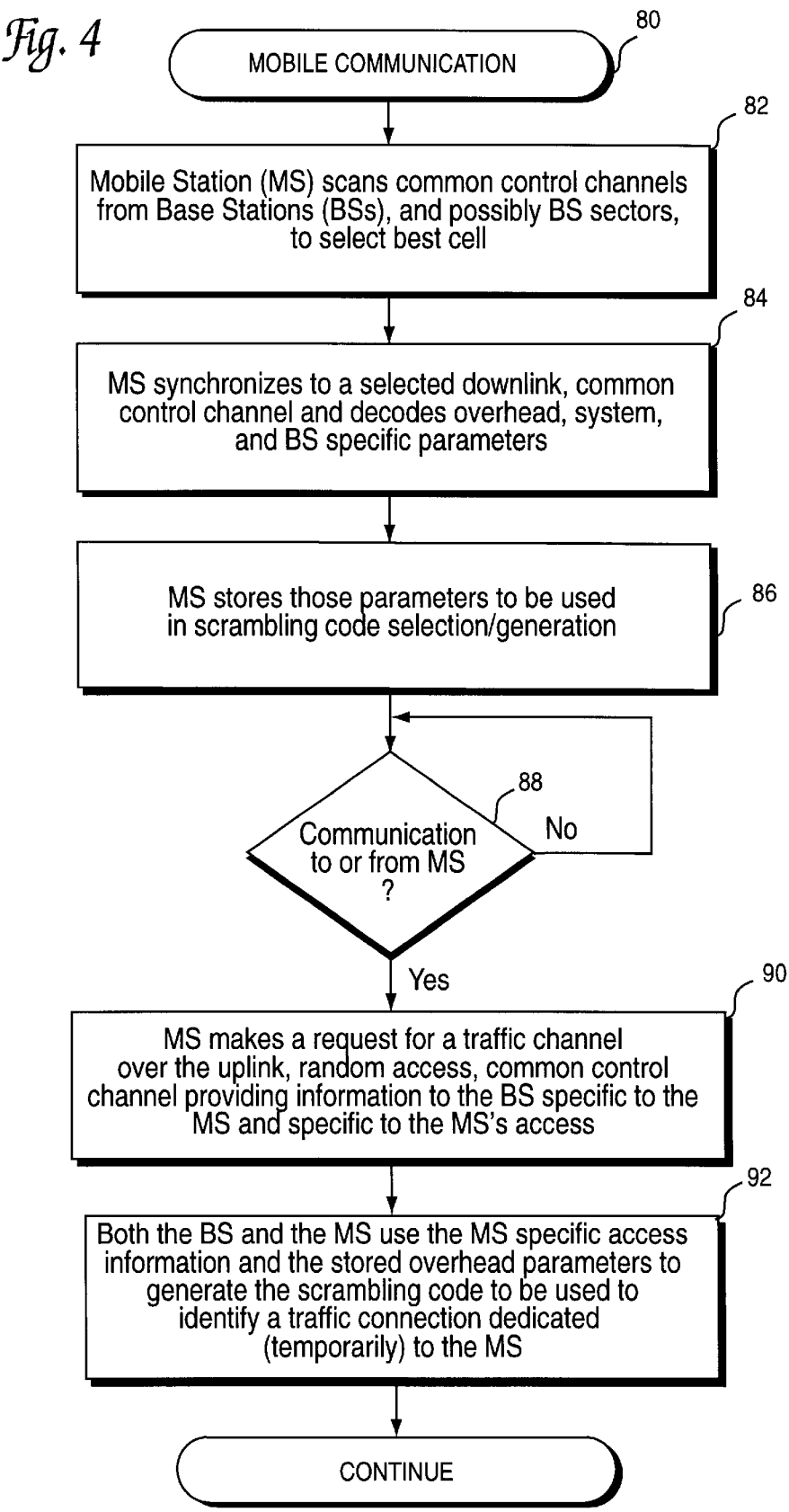
FIG. 4 is a flowchart diagram illustrating example procedures in which the present invention is applied to allocating uplink scrambling codes in a spread spectrum communications system.

A more specific set of procedures for a Mobile Communication (block 80) is outlined in the flowchart shown in FIG. 4 where the example communications resource is uplink scrambling codes for use in a WCDMA system such as that shown in FIG. 1. When a mobile station is ready to commence transmitting or receiving messages, it synchronizes to the selected downlink, common control channel using established procedures and decodes overhead, system, and cell-specific parameters acquired from the selected common control channel (block 84). Typical ones of such parameters might include a system identification (SID), a network identification (NID), a registration zone, a base station identifier, a cell identifier, common channel information, power regulation parameters, base station geographical positioning parameters, and system frame number information, etc. The mobile station then stores one or more of those parameters for use in the determination of an uplink scrambling code to identify communications specific to the mobile station (block 86).

A decision is made in block 88 whether there is a communication to be directed to or transmitted from the mobile station requiring the setup of a dedicated channel resource. If there is, the mobile station makes a request for a traffic channel over an uplink common control channel such as a random access channel. In that request, the mobile station provides information to the base station that is specific to the mobile station and specific to this particular access being made by the mobile station (block 90), e.g., the specific time or time slot at which the access is made and/or specific information conveyed for that access such as an access reference or signature. Depending upon the specific scrambling code selection, generation, or determination procedures employed, both the mobile station and the base station use one or more of the mobile-specific access parameters and the stored overhead type parameters to generate the uplink scrambling code allocated to the traffic connection dedicated (at least temporarily) to the mobile which is thereafter used to scramble and descramble communications over that connection (block 92).

Figure 5:
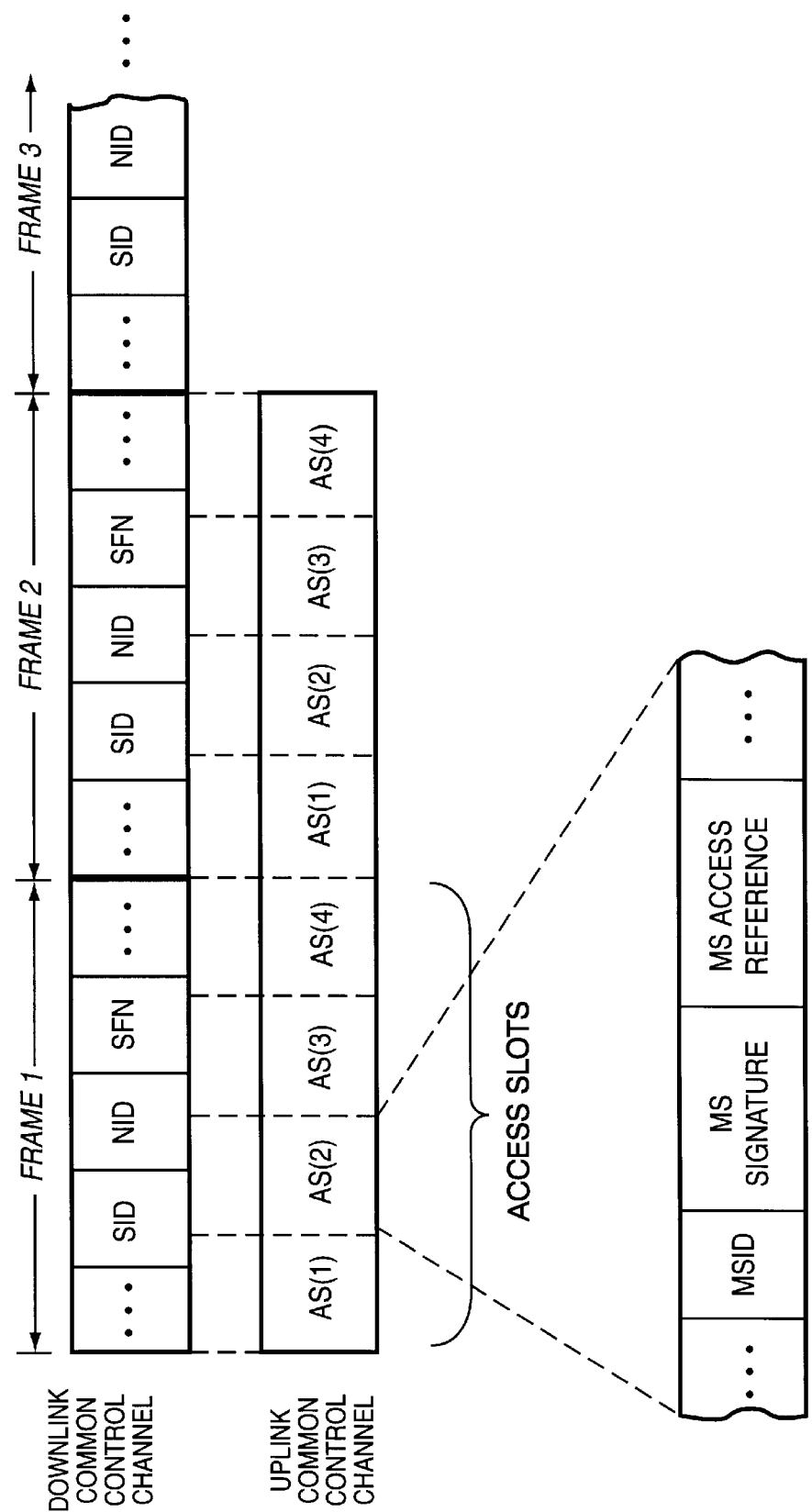
FIG. 5 is a diagram illustrating various parameters included in a first format of a broadcast control channel and a random access channel that may be used to implicitly determine a particular communications resource.
Figure 6:
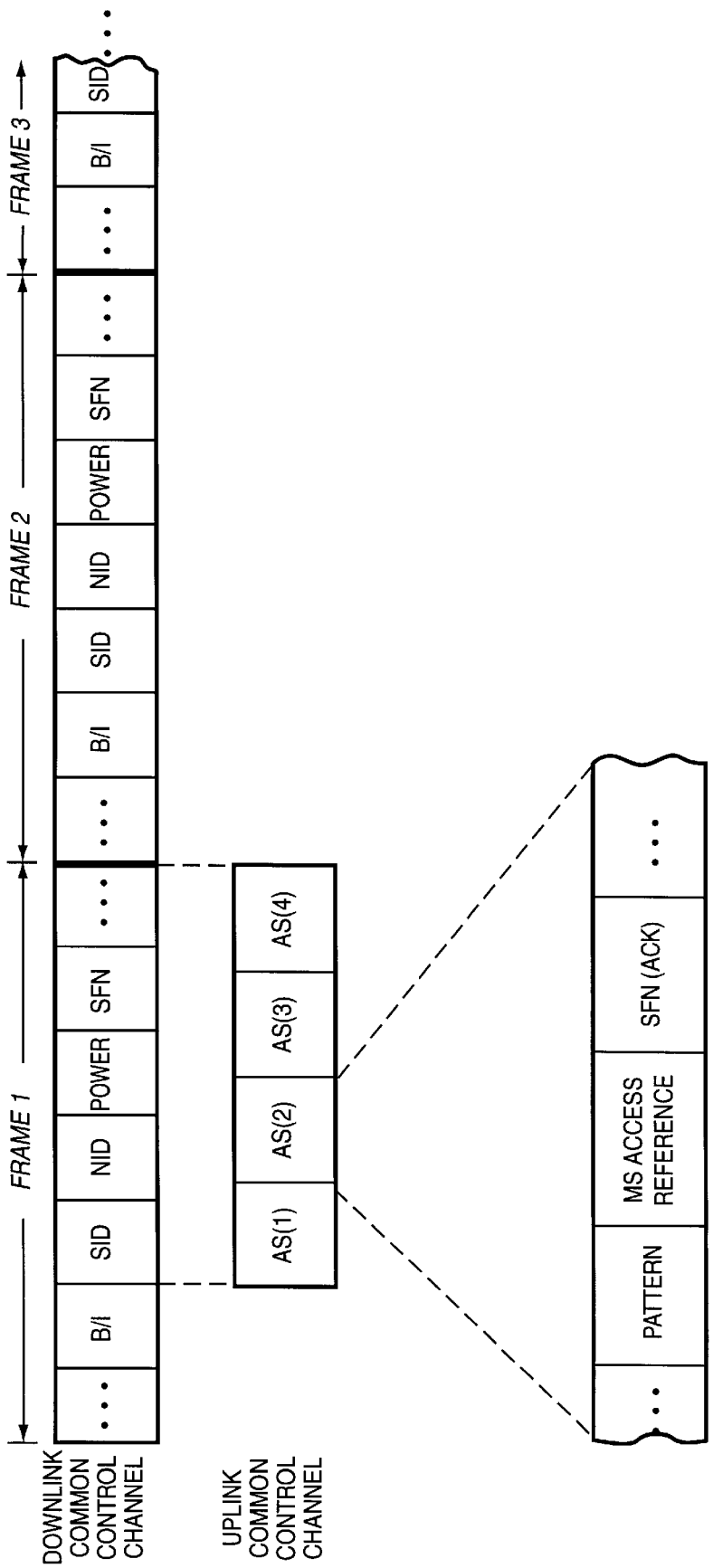
FIG. 6 is a diagram illustrating various parameters included in a second format of a broadcast control channel and a random access channel that may be used to implicitly determine a particular communications resource.

FIGS. 5 and 6 illustrate two non-limiting, examples of downlink overhead parameters and mobile station-specific access parameters that may be used to generate an uplink scrambling code for a mobile station communication. FIG. 5 shows a downlink common control channel transmitted by a base station (or a base station sector) used by mobile stations for one or more procedures like registration, paging, access, etc. procedures. The parameters conveyed over the downlink common control channel are repeated in consecutive frames, each frame having a system frame number (SFN). Each numbered frame includes various overhead, system, and base station specific parameters. Each frame includes a specific system frame number between zero to N. Also included in the BCCH (however not necessarily in each frame) is a cellular system identification (SID), and a cellular network identification (NID). Of course, other and/or additional parameters may be included in the downlink common control message frames.

When the mobile station requests a traffic channel, it sends a message on an uplink common control channel to the base station. In this embodiment, the uplink common control channel employs a slotted ALOHA random access format. In ALOHA, stations transmit messages on the channel as they are generated. Collision resolution is achieved by retransmitting a message packet at random delays. Slotted ALOHA reduces the vulnerability of collisions by constraining transmission to fixed length time slots or access slots (AS). This increases maximum throughput as well as provides low access delays and the ability to handle variable length messages.

FIG. 5 shows four random access slots AS(1)–AS(4) per downlink common control channel frame. The access slots are synchronized in some fashion to each frame of the downlink common control channel so that synchronization between the mobile station and base station is maintained. One of the four access slots is the allowed time instant in a frame when a mobile station may send a random access channel frame to the base station. In FIG. 5, the mobile station has sent a random access message on access slot 2 AS(2).

Each random access slot may include the identification of the mobile (MSID) and other parameters such as a particular signature selected by the mobile from a limited set of signatures used to further decrease the probability of collision on the access channel. That way even if a plurality of mobile stations select the same access slot, they can still be individually resolved at the base station if they have chosen different signatures. The access slot AS and signature for the uplink common control channel frame transmission are typically selected pseudo-randomly by the mobile station. Another pseudo-randomly selected parameter that could be included in the random access slot is a mobile station access reference (AR).

The example set of initialization parameters SID, CID, SFN(R), AS(R), SIG(R), and AR(R) is extremely likely to be a unique combination of parameters. At the successful reception of the random access channel frame at the base station, this set of parameters is known by both the base station and the mobile station. In accordance with the present invention in this example embodiment, the mobile's uplink scrambling code is then determined as a function of this parameter set:

Scrambling Code=F{SID, CID, SFN(R), AS(R), SIG(R), AR(R)}.

Thus, scrambling codes are determined "implicitly" without having to actually exchange the scrambling code itself or even its identity between the mobile and base stations.

As an example, assume that the scrambling code may be generated using two, 41 bit linear feedback shift registers, such as those shown in the example in FIG. 7. Those shift registers generate "Gold" codes using two sequences. Assume for purposes of example, that the system identification (SID) can be represented with eight bits, the cell identifier (CID) with nine bits, the access reference (AR) with eight bits, the signature (SIG) by six bits, the access slot (AS) by two bits, and the system frame number (SFN) by eight bits. These 41 bits in total could be used to define the state of one of the illustrated shift registers, the other shift register could be initialized to all "1's," and from that state, generate the uplink scrambling code.

In this example, the generated uplink scrambling code has a collision risk only when multiple mobile stations send to the same base station a random access channel frame at the same system frame number, at the same access slot, using the same signature, and using the same access reference. The probability of this happening is extremely small. While the scrambling code is likely used to scramble a dedicated traffic channel, the implicitly generated code could be used to scramble messages conveyed directly to the random access channel slot itself However, in the latter situation, the access reference AR should be omitted from the implicit scrambling code iteration since it is typically transmitted as part of the reverse access channel frame itself.

As an alternative example to the slotted ALOHA random access procedure shown in FIG. 5, carrier sends multiple access (CMSA) techniques may be used for the random access channel as illustrated in FIG. 6. In CMSA techniques, multiple stations contend for access through a common control channel by listening to see if the channel is idle, typically by monitoring a busy/idle (B/I) bit. In this approach, each downlink control channel frame includes a busy/idle (B/I) flag to minimize collisions along with a power control command. In order to transmit a message on the random access channel, the mobile station reads the busy/idle flag in the corresponding frame of the broadcast control channel and waits until the flag is idle. When an idle flag is detected, the mobile station transmits a pattern known to the base station at low power obeying the power control commands transmitted on the broadcast control channel frame.

The base station then transmits "power up" commands until it receives the known pattern from the mobile station over the random access channel at a sufficient power or signal-to-noise ratio. Thereafter, the base station instructs the mobile to maintain that power using the power control commands and sets the busy/idle flag to busy to prevent other mobile stations from transmitting. The mobile station then transmits its message during a random access channel frame, still obeying the power control commands, preferably using the access slot and access reference techniques described above with respect to FIG. 5. When the base station successfully detects and decodes the message from the mobile station, it sets the busy/idle flag back to idle and sends an acknowledgment on a common control channel (e.g., the FACH) (not shown in FIG. 6), the acknowledgment including the detected access reference. If the mobile station does not receive that acknowledgment within a predetermined time period, it repeats the above procedure.

From the example in FIG. 6, those parameters already described above with respect to the example shown in FIG. 5 may be used to generate an appropriate scrambling code coupled along with one or both of the following: the time instant when the above-described, downlink acknowledgment message is received and the time instant when the above-described busy/idle flag is reset. Of course, other time instants may be used. Even the absolute system time might be used as one of the parameter.

Although these two example access techniques have described, the present invention is not limited to these techniques; other access techniques may of course be employed. Further, the invention may be applied to an access approach that combines features of both slotted-ALOHA and CSMA.

While the invention has been described in connection with what is presently considered to be the most practical and preferred embodiments, it is to be understood that the invention is not limited to the disclosed embodiments. On the contrary, the present invention is intended to cover various modifications and equivalent arrangements included within the spirit and scope of the appended claims.

What is claimed is:

1. In a communications system for transmitting an information signal from a first transceiver corresponding to a mobile station to a remotely-located second transceiver corresponding to a base station, a method comprising:

the mobile station synchronizing with and receiving broadcast parameters transmit over a broadcast channel by the base station and sending a message on an access channel to the base station including mobile station access parameters;

determining one of plural communication resources at the mobile station and base station that distinguishes a communication associated with the mobile station from communications associated with other mobile stations using one or more parameters available at the mobile station and base station that do not directly identify the one of the communication resource, wherein the one or more parameters includes one or more of the following broadcast parameters: a system identification, a base station identification, and a broadcast channel frame number; and transmitting the information signal from the mobile station to the base station using the one communications resource.

2. The method in claim 1, wherein the communications system is a spread spectrum cellular radio communications system and the plural communication resources are scrambling codes, the method further comprising:

the mobile station performing an control procedure with the base station to enable communication between the mobile station and the base station, where during the control procedure, the mobile station provides the base station with the one or more parameters, and using one of the scrambling codes determined using the one or more parameters to scramble the information signal.

3. The method in claim 1, wherein the one or more parameters includes one of the broadcast parameters and one of the mobile station access parameters.

4. The method in claim 3, wherein the one or more parameters includes a fixed parameter previously known to the mobile and base stations.

5. The method in claim 1, the generating step further comprising:

determining an address for the one communications resource using one of the broadcast parameters and one of the mobile station access parameters.

6. The method in claim 1, wherein the mobile station access parameters include one or more of the following: a mobile station identifier, an access time slot, an access reference number, and a broadcast channel frame number acknowledgment.

7. The method in claim 1, wherein the one or more parameters includes a parameter indicating an identity of the cellular radio communications system.

8. The method in claim 1, wherein the one or more parameters includes a parameter indicating an identity of the base station of mobile station.

9. In a communications system for transmitting an information signal from a first transceiver corresponding to a mobile station to a remotely-located second transceiver corresponding to a base station, a method comprising:

the mobile station synchronizing with and receiving broadcast parameters transmit over a broadcast channel by the base station and sending a message on one access channel to the base station including mobile station access parameters;

determining one of plural communication resources at the mobile station and base station that distinguishes a communication associated with the mobile station from communications associated with other mobile stations using one or more parameters available at the mobile station and base station that do not directly identify the one communication resource; and transmitting the information signal from the mobile station to the base station using the determined communications resource, wherein the one or more parameters includes a parameter indicating a time instant of communication on an access channel between the mobile station and the base station.

10. In a spread spectrum cellular communications system for transmitting an information signal from a mobile transceiver to a base station transceiver, the mobile transceiver comprising:

a scrambling code generator configured to determine a scrambling code from one or more parameters available at the mobile and base station transceivers as a result of a signaling procedure performed to enable communication between the mobile and base station transceivers, where the one or more parameters is not explicitly related to scrambling codes used to distinguish among communications corresponding to mobile transceivers;

a scrambler configured to scramble the information signal using the determined scrambling code that distinguishes communications corresponding to the mobile transceiver from communications corresponding to other transceivers; and transmission circuitry configured to transmit the scrambled information signal provided by the scrambler to the base station transceiver, wherein the scrambling code generator is further configured to generate an address for a corresponding scrambling code using a downlink control channel parameter and a mobile transceiver uplink access channel parameter.

11. The mobile transceiver in claim 10, wherein the signaling procedure includes the mobile transceiver synchronizing with and receiving downlink parameters transmit over a downlink control channel by the base station transceiver and sending a message on an uplink access channel to the base station.

12. The mobile transceiver in claim 11, wherein the one or more parameters includes one of the downlink parameters and one of the mobile transceiver access parameters.

13. The mobile transceiver in claim 11, wherein the scrambling code generator includes a feedback shift register and the scrambling code generator is configured to determine the initial contents of the feedback shift register using one of the downlink parameters and one of the mobile transceiver access parameters.

14. The mobile transceiver in claim 11, wherein the one or more parameters includes a parameter indicating an identity of the cellular radio communications system or a parameter indicating an identity of the base station transceiver or a parameter indicating a cell identity.

15. The mobile transceiver in claim 10, further comprising:

receiving circuitry configured to receive a radio signal and generate a baseband signal, and a descrambler configured to descramble the baseband signal using the scrambling code.

16. In a spread spectrum cellular communications system for transmitting an information signal from a mobile transceiver to a base station transceiver, the mobile transceiver comprising:

a scrambling code generator configured to determine a scrambling code from one or more parameters available at the mobile and base station transceivers as a result of a signaling procedure performed to enable communication between the mobile and base station transceivers, where the one or more parameters is not explicitly related to scrambling codes used to distinguish among communications corresponding to mobile transceivers;

a scrambler configured to scramble the information signal using the determined scrambling code that distinguishes communications corresponding to the mobile transceiver from communications corresponding to other transceivers; and transmission circuitry configured to transmit the scrambled information signal provided by the scrambler to the base station transceiver;

wherein the one or more parameters includes a parameter indicating a time instant of communication on the access channel.

17. In a spread spectrum cellular communications system for transmitting an information signal from a mobile transceiver to a base station transceiver, the mobile transceiver, comprising:

a scrambling code generator configured to determine a scrambling code from one or more parameters available at the mobile and base station transceivers as a result of a signaling procedure performed to enable communication between the mobile and base station transceivers, where the one or more parameters is not explicitly related to scrambling codes used to distinguishes communications corresponding to the mobile transceivers;

a scrambler configured to scramble the information signal using the determined scrambling code that distinguishes communications corresponding to the mobile transceiver from communications corresponding to other transceivers; and transmission circuitry configured to transmit the scrambled information signal provided by the scrambler to the base station transceiver, wherein the one or more parameters includes a parameter indicating a randomly generated access reference or a randomly generated access signature associated with the mobile transceiver.

18. In a spread spectrum cellular communications system for transmitting an information signal from a mobile transceiver to a base station transceiver, the mobile transceiver comprising:

a scrambling code generator configured to determine a scrambling code from one or more parameters available at the mobile and base station transceivers as a result of a signaling procedure performed to enable communication between the mobile and base station transceivers, where the one or more parameters is not explicitly related to scrambling codes used to distinguish among communications corresponding to mobile transceivers;

a scrambler configured to scramble the information signal using the determined scrambling code that distinguishes communications corresponding to the mobile transceiver from communications corresponding to other transceivers; and transmission circuitry configured to transmit the scrambled information signal provided by the scrambler to the base station transceiver, wherein the parameters include one or more of the following: a system identification, a base station transceiver identification, a cell identification, and a downlink channel frame number.

19. The mobile transceiver in claim 18, wherein the mobile transceiver access parameters include one or more of the following: a mobile transceiver identifier, an access time slot, an access reference number, and a frame number acknowledgment.

20. In a spread spectrum cellular communications system for transmitting an information signal from a mobile station transceiver to a base station transceiver, the base station transceiver comprising:

receiving circuitry configured to receive a radio signal and generating a baseband signal;

a scrambling code generator configured to determine a scrambling code from one or more parameters available at the mobile and base station transceivers as a result of a signaling procedure performed to enable communication between the mobile and base station transceivers, where the one or more parameters are not directly related to scrambling codes used to distinguish among communications associated with mobile stations;

a descrambler configured to descramble the baseband signal from the receiving circuitry using the determined scrambling code that distinguishes communications associated with the mobile transceiver from communications associated with other transceivers to recover the information signal from the mobile station transceiver; and wherein the signaling procedure includes the mobile station transceiver receiving downlink parameters transmit over a downlink control channel by the base station transceiver and sending a message on an uplink access channel to the base station transceiver including the mobile station transceiver access parameters, and wherein the one or more downlik parameters includes: a sytem identification, a base station identification, and a broad channel frame number.

21. The base station transceiver in claim 20, wherein the one or more parameters includes one of the downlink parameters and one of the mobile station transceiver access parameters.

22. In a radio communications system for transmitting an information signal from a mobile station to a radio access network, a method comprising:

implicitly allocating a communications channel resource to permit communication between the mobile station and radio access network without transmitting a signal between the mobile station and radio access network that explicitly allocates the communications channel resource including determining at the mobile station the communications channel resource using one or more parameters known to both the mobile station and the radio access network that do not relate specifically to the communications channel resource, and conducting a communication between the mobile station radio access network using the implicitly allocated communications channel resource, wherein the one or more parameters includes a parameter indicating a time instant of a request for a communications channel resource by the mobile station over an access channel.

23. The method in claim 22, wherein the radio communications system is a spread spectrum cellular communications system and the communications channel resource is a scrambling code.

24. The method in claim 22, the implicitly allocating step further comprising:

determining at the mobile station the communications channel resource using one or more parameters known to both the mobile station and the radio access network that does not relate specifically to the communications channel resource.

25. The method in claim 22, wherein the one or more parameters includes a parameter selected randomly by the mobile station and transmitted to the radio access network on the access channel.

26. The method in claim 22, wherein the one or more parameters includes an identification of the communications system, the radio access network, or the mobile station.

27. The method in claim 22, the implicitly allocating step further comprising:

determining at the radio access network the communications channel resource using one or more parameters known to both the mobile station and radio access network that does not relate specifically to the communications channel resource.

* * * * *